UNITED STATES PATENT OFFICE.

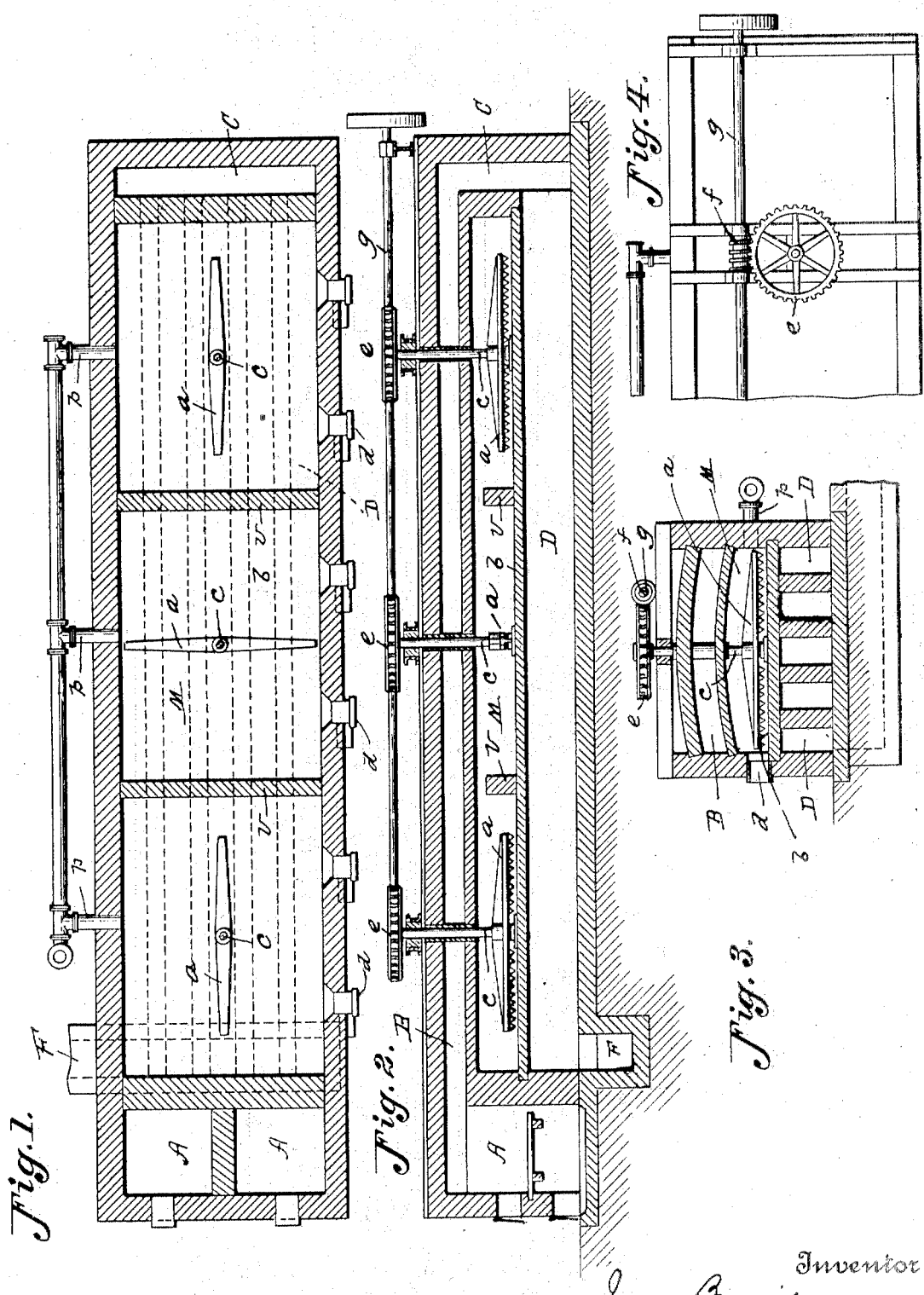

JAMES BEVERIDGE, OF CHATHAM, NEW BRUNSWICK, CANADA.

METHOD FOR TREATING NITER CAKE.

1,315,811.     Specification of Letters Patent.     Patented Sept. 9, 1919.

Application filed October 7, 1918. Serial No. 257,245.

*To all whom it may concern:*

Be it known that I, JAMES BEVERIDGE, a subject of the King of Great Britain, and a resident of Chatham, county of Northumberland, Province of New Brunswick, Dominion of Canada, have invented certain new and useful Improvements in Methods for Treating Niter Cake, of which the following is a full and clear specification.

The object of this invention is to provide a method of obtaining valuable products from niter-cake, such as sulfurous acid, sulfites and bisulfites of lime, magnesia or soda for wood-pulp manufacture and for other purposes.

Niter-cake is a by-product of the manufacture of nitric acid and consists of an acid sodium sulfate of the chemical formula $NaHSO_4$, or of a neutral sodium sulfate containing a large percentage of free sulfuric acid. When this niter-cake is heated with carbon to decomposition temperature, the said acid sodium sulfate or free acid is decomposed or split up into sulfur dioxid, carbonic dioxid and water, according to the following chemical equation, viz.:

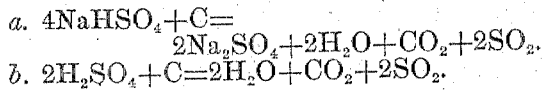

*a.* $4NaHSO_4 + C = 2Na_2SO_4 + 2H_2O + CO_2 + 2SO_2$.

*b.* $2H_2SO_4 + C = 2H_2O + CO_2 + 2SO_2$.

The gases thus evolved pass off, leaving behind a more or less neutral sodium sulfate, in accordance with the completeness of the chemical reaction.

In order to carry out my invention in manufacturing practice, I grind to a fine powder and thoroughly mix together niter-cake and vegetable carbon, preferably wood charcoal, in the proportion of one hundred parts of niter-cake to five or six parts of charcoal and heat the mixture in a specially constructed muffle furnace maintained at a temperature of from 500 to 1400 degrees Fahrenheit, whereby gaseous sulfur dioxid, carbonic acid and water are disengaged or given off from the said mixture, while a more or less neutral sodium sulfate remains behind. During the heating, small quantities of sulfur trioxid are also given off.

The gases evolved in the decomposition of the acid sodium sulfate ($NaHSO_4$) or sulfuric acid ($H_2SO_4$) contained in the niter-cake are drawn off from the furnace by means of a fan, vacuum pump or other convenient means and, subject to absorption in stages, being conducted first through a series of lead pipes immersed in cold water in order to cool them to about the temperature of the atmosphere; and, secondly, through an absorption vessel or tower, built of sheet lead and filled loosely with an acid-resisting material such as hard burned coke, lump quartz, or hard burned earthenware brick or tiles, the said material being kept moist with water, in order that the said moistened material will absorb and remove from the passing gases the sulfur trioxid; and, thirdly, through a vessel or vessels containing an oxygen-containing compound of a metal of the alkalis or alkaline earths as weak milk of lime or milk of magnesia, either separately or as a mixture of both (lime and magnesia), or through an aqueous solution of an alkali such as sodium carbonate or hydroxid, whereby the sulfur dioxid is absorbed and separated from the carbonic acid and any air with which the gases from the furnace are mixed. The sulfur dioxid forms a sulfite or bisulfite with the milk of lime, magnesia or alkali, as the case may be. In lieu of milk of lime, magnesia or an aqueous solution of sodium carbonate or hydroxid, the cooled gases from the furnace may be conveyed into a tower or towers containing limestone kept moist with a down-flow of water; or, in place of such tower or towers, be sucked with the aid of a vacuum apparatus through a body of lump limestone immersed in water and contained in vessels constructed of wood or other acid-resisting materials, the object in both cases being to separate the sulfur dioxid by absorption from the carbon dioxid and to form a sulfite or bisulfite of lime suitable for the manufacture of wood-pulp by what is known as the "sulfite" process, or for other purposes.

The particular form of furnace I employ for decomposing the acid sodium sulfate or the free sulfuric acid in the niter-cake is built of fire-brick materials and is shown in the accompanying drawing, in which—

Figure 1 is a sectional plan;

Fig. 2 is a horizontal section; and

Fig. 3 is a cross-section through the center or middle of the said furnace.

I place the fire-place A at one end; the products of combustion passing along the flue B to the end and taking a downward course through C enter the flues D beneath the bed of the muffle M and finally escape by the flue F to the chimney. Suitable doors *d* are provided in the front of the furnace opening into the muffle, to enable the operator or workman to throw the charge or mixture of niter-cake and charcoal or vegetable carbon into the muffle and to withdraw the more or less neutral sulfate when the chemical action between the niter-cake and charcoal has ceased or nearly so. Instead of charging the furnace with the mixture through the doors, I find it advantageous to do so through earthenware pipes in the arches from hoppers placed above these pipes. I also find it advantageous to divide the hearth $b$ in the muffle M by the cross-walls $v$ into two or more sections, so that a portion of the mixture of niter-cake and carbon can be placed in each section at intervals to insure a more uniform disengagement of sulfur dioxid and other gases. Three pipes $p$ are in each section and connected together on the outside as shown are provided to take away the sulfur dioxid, carbonic acid and water, all more or less mixed with air, to the cooler, purifier and absorbing apparatus above described where the separation of the sulfur dioxid from the carbonic acid takes place. The mixture, when in the muffle of the furnace, should be stirred with a rake to promote the decomposition of the acid sulfate or free sulfuric acid, and the draft from the interior of the muffle M regulated to prevent the gases which are heavier than air from escaping through the doors $d$.

Any suitable apparatus may be employed for stirring the mixture in the muffle. I prefer the mechanism illustrated, which consists mainly of a rake or stirrer $a$ mounted in each of the compartments and affixed to the lower end of a vertical shaft $c$ extending up through the flue B and provided with a worm-gear $e$ at its upper end. The three worm-gears are operated in unison by means of worms $f$ affixed to a horizontal shaft $g$ journaled on top of the furnace and arranged to be driven in any suitable manner.

The nature and scope of the invention having been thus indicated and its preferred embodiment having been specifically described, what is claimed as new is:

1. The method, which comprises heating niter-cake in a substantially non-oxidizing atmosphere with carbonaceous material at a temperature sufficient to convert the acid sulfate content of the cake into normal sulfate and decompose any sulfuric acid present, and converting the sulfur trioxid content of the gases into sulfuric acid and reacting with the remaining sulfur dioxid content on substances capable of forming therewith commercial sulfites.

2. The method, which comprises heating niter-cake in a muffle furnace with carbon at a temperature sufficient to convert the acid content of the cake into normal sulfate and to decompose any free acid, and subjecting the gases first to absorption in water to form acid and then to alkali metal compound containing oxygen and capable of forming a sulfite.

In testimony whereof I hereunto affix my signature.

JAMES BEVERIDGE.